United States Patent [19]

Minami et al.

[11] 4,107,920
[45] Aug. 22, 1978

[54] METHOD OF AND APPARATUS FOR CONTROLLING AIR/FUEL RATIO IN INTERNAL COMBUSTION ENGINE

[75] Inventors: Hidehiro Minami, Yokohama; Kenji Ikeura; Giichi Shioyama, both of Yokosuka, all of Japan

[73] Assignee: Nissan Motor Company, Limited, Japan

[21] Appl. No.: 631,313

[22] Filed: Nov. 12, 1975

[30] Foreign Application Priority Data

Nov. 13, 1974 [JP] Japan .................. 49-136575[U]
Apr. 10, 1975 [JP] Japan .................. 50-48815[U]
Apr. 8, 1975 [JP] Japan .................. 50-47519[U]

[51] Int. Cl.² ......................................... F02B 75/10
[52] U.S. Cl. ............................. 60/276; 123/119 EC
[58] Field of Search ............ 60/274, 276; 123/32 EA, 123/119 R, 32 EE, 119 EC

[56] References Cited

U.S. PATENT DOCUMENTS

| | | | |
|---|---|---|---|
| 3,745,768 | 7/1973 | Zechnall | 60/276 |
| 3,828,749 | 8/1974 | Knapp | 60/276 |
| 3,861,366 | 1/1975 | Masaki | 123/119 R |
| 3,906,910 | 9/1975 | Szlaga | 123/119 R |
| 3,921,612 | 11/1975 | Aono | 123/119 R |
| 3,939,654 | 2/1976 | Creps | 60/276 |
| 3,949,551 | 4/1976 | Eichler | 60/276 |
| 3,961,477 | 6/1976 | Grieshaber | 60/276 |
| 3,963,009 | 6/1976 | Mennesson | 60/276 |

*Primary Examiner*—Douglas Hart
*Attorney, Agent, or Firm*—Robert E. Burns; Emmanuel J. Lobato; Bruce L. Adams

[57] ABSTRACT

A method of and apparatus for controlling the air-to-fuel ratio of a combustible mixture in an internal combustion engine of the particular type using mixture control means arranged to regulate the air-to-fuel mixture within a predetermined relatively high range for the purpose of enabling an exhaust cleaning catalytic reactor to perform its maximum function, characterized in that the air-to-fuel ratio is reduced, viz., the mixture is enriched during highly loaded operational conditions of the engine by supplying additional fuel to the mixture supply system of the engine, temporarily disabling the mixture control means during such conditions or diluting the exhaust gases during high load conditions of the engine so that the control means is caused to operate in such a manner as to compensate for the reduced concentration of air in the exhaust gases.

1 Claim, 8 Drawing Figures

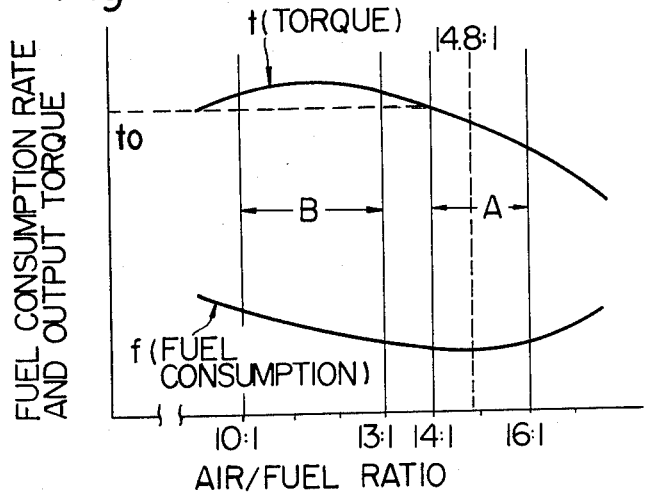
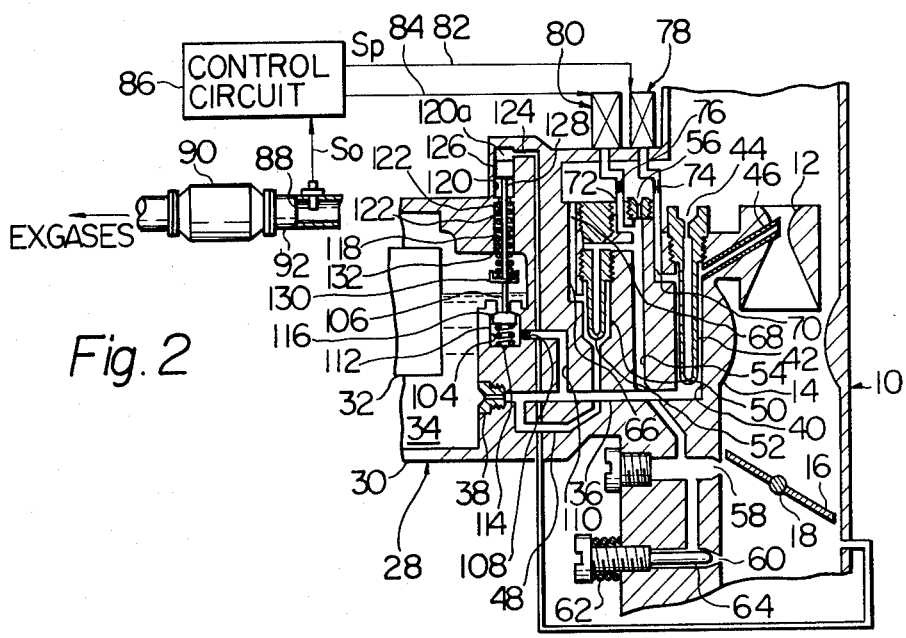

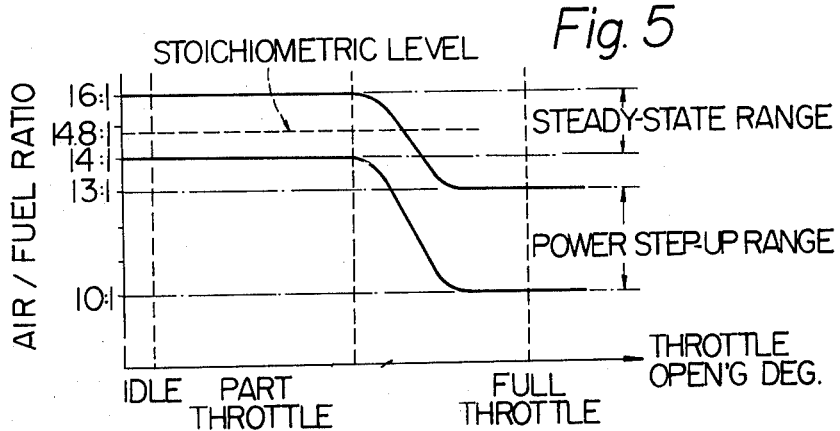
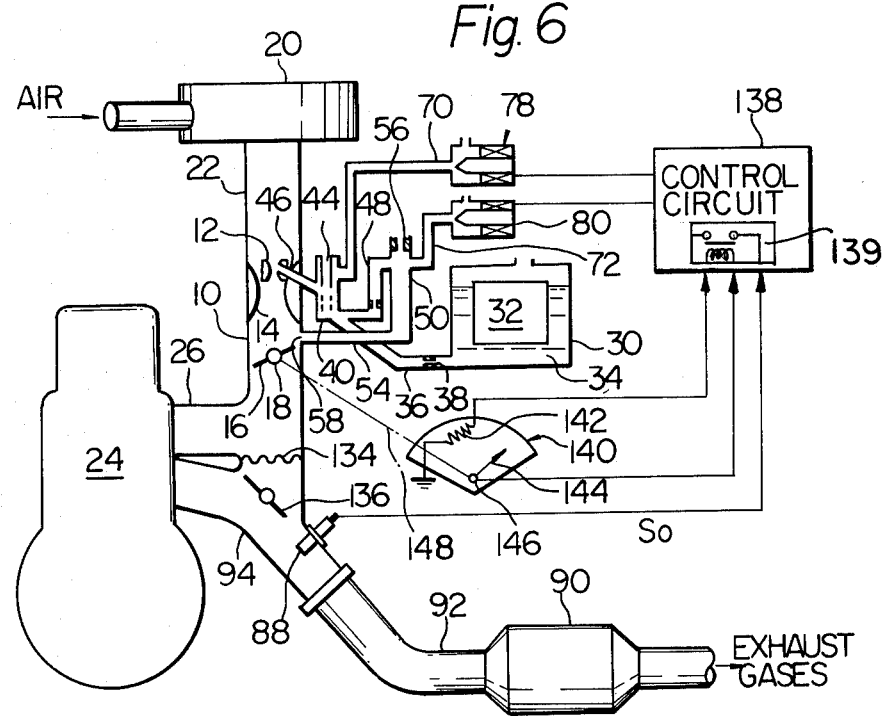

METHOD OF AND APPARATUS FOR CONTROLLING AIR/FUEL RATIO IN INTERNAL COMBUSTION ENGINE

BACKGROUND OF THE INVENTION

The present invention relates to automotive internal combustion engines and, more specifically, to an automotive internal combustion engine of the particular nature having mixture control means adapted to regulate the concentration of fuel or, more exactly, the ratio between the air and fuel components in the air-fuel mixture to be supplied to the engine cylinders through detection of the concentration of any of the chemical components in the exhaust gases being emitted from the engine. The chemical component whose concentration is to be detected may be the oxygen, hydrocarbon, carbon monoxide or dioxide or nitrogen oxide component in the exhaust gases although the oxygen component in particular is usually preferred for ease of detection and accuracy in approximating therefrom the proportions of the various components of the exhaust gases. An analog signal proportional or otherwise representative of the detected concentration is supplied to a computing circuit which is arranged to produce an output signal, usually of a pulse form, for controlling the mixture supply system (which may be a carburetor or of the fuel injection type) of the engine in such a manner that the air-to-fuel ratio of the mixture to be produced in the system is maintained within a predetermined range.

Apart from this, some modernized automotive vehicles are equiped with catalytic reactors in the exhaust systems of the engines. The catalytic reactor is reactive to a predetermined kind or predetermined kinds of toxic, air contaminative compounds such as hydrocarbons, carbon monoxide and nitrogen oxides in the exhaust gases for converting such compounds into harmless substances before the exhaust gases are discharged to the open air. The above described mixture control means is useful especially when combined, in effect, with the catalytic reactor of this character because the reactor will be enabled to best exhibit its potential function if the mixture control means is arranged in such a manner that the air-to-fuel ratio of the mixture produced in the mixture supply system of the engine is regulated toward a certain value optimum for the performance characteristics of the reactor or maintained within a predetermined range containing such a value. If, for example, catalytic reactor is of the ternary type which is capable of concurrently processing the above-mentioned three kinds of contaminants, viz., hydrocarbons, carbon monoxide and nitrogen oxides in the exhaust gases, it is advantageous that the mixture control means be arranged so that the air-to-fuel ratio of the mixture is regulated toward a stoichiometric ratio of approximately 14.8:1 or maintained with a predetermined range containing the stoichiometric ratio. This is because of the fact that it is the stoichiometric mixture which enables the ternary type catalytic reactor to achieve its maximum conversion efficiency, as is well known in the art.

As is also well known in the art, the air-to-fuel ratio of the mixture supplied to the engine cylinders is predominant over the power output and the fuel consumption rate of the engine. If, thus, the air-to-fuel ratio of the mixture to be supplied to the engine cylinders is controlled without respect to the varying operational conditions of the engine, then the engine will fail to operate properly throughout the various modes of operation, especially during high load operating conditions. Such a problem will arise not only when the mixture control means is used in combination with a catalytic reactor of any type but when the control means is provided in an internal combustion engine which is void of such a reactor because, in whichsoever case, the control means is so arranged as to control the air-to-fuel ratio of the mixture virtually regardless of the actual operating conditions of the engine. The present invention contemplates provision of a useful, simple and economically readily feasible solution to this problem.

SUMMARY OF THE INVENTION

It is, accordingly, an object of the present invention to provide a method of controlling the air-to-fuel ratio of a combustible mixture for an automotive internal combustion engine in such a manner that the air-to-fuel ratio is maintained within a relatively high range (producing a relatively lean mixture) during low to medium load conditions of the engine and altered into a relatively low range (producing a richer mixture) during highly loaded operating conditions of the engine.

It is another object of the present invention to provide an apparatus for carrying the method into practice in an ordinary automotive internal combustion engine having a mixture supply system using a carburetor or of the fuel injection type.

In accordance with one important aspect of the present invention, there is provided, in an automotive internal combustion engine having a mixture supply system, an exhaust system, a sensor mounted in the exhaust system for detecting the air-to-fuel ratio of the exhaust gases in the exhaust system for producing a signal representative of the detected air-to-fuel ratio and control means responsive to the signal for maintaining within a predetermined relatively high range the air-to-fuel ratio of the mixture produced in the mixture supply system, a method of improving the power output characteristics of the engine, comprising detecting variation of the load on the engine, and altering the air-to-fuel ratio of the mixture into a range lower than the relatively high range during high load conditions of the engine.

In accordance with another important aspect of the present invention, there is provided in the automotive internal combustion engine of the type above described an apparatus comprising detecting means for detecting variation in the load on the engine, and additional control means operative to alter the air-to-fuel ratio of the mixture into a range lower than the above-mentioned relatively high range under high load conditions of the engine. The mixture supply system of the internal combustion engine to incorporate the improvement according to the present invention may be a carburetor or of the fuel injection type. If it is desired to have the above described apparatus incorporated into an internal combustion engine using a carburetor, the detecting means may comprise a piston movable in a chamber, means for introducing into the chamber vacuum developed in the carburetor for moving the piston in one direction, biasing means for urging the piston in the opposite direction, in which instance the above-mentioned additional control means comprises passageway means for providing communication between the fuel storage means and the main fuel supply circuit of the carburetor, valve means provided in the passageway means for blocking the above-mentioned communication, and biasing means for urging the valve means to block the communication between the fuel storage means and the main fuel supply circuit, the piston being engageable with the valve means when moved in the aforesaid opposite direction for providing the communicaton between the storage means and the main fuel supply circuit. As an alternative, the additional control means may comprise passageway means for providing communicaton between the atmosphere and the exhaust system upstream of the sensor, valve means provided in the passageway means for blocking the above-mentioned communication, vacuum operated actuating means connected to the valve means and including biasing means for urging the valve means to block the communication between the atmosphere and the exhaust system through the passageway means, and means operated by the aforesaid detecting means for introducing vacuum from the carburetor into the actuating means in response to high load conditions of the engine for causing the actuating means to move the valve means into a position to establish the communication between the atmosphere and the exhaust system through the passageway means whereby the mixture control means is caused to produce enrichment of the mixture in the carburetor. Further alternatively, the additional control means may comprise, in an internal combustion engine using a carburetor or a fuel-injection mixture supply system, tripping means for disabling the previously mentioned mixture control means temporarily under high load conditions of the engine whereby fuel is delivered through the main and low-speed fuel supply circuits of the carburetor or through the fuel injection nozzles of the fuel-injection type mixture supply system at an increased rate independently of the mixture control means.

BRIEF DESCRIPTION OF THE DRAWINGS

The features and advantages of the present invention will become more apparent from the following description taken in conjunction with the accompanying drawings in which like reference numerals designate corresponding units and members and in which:

FIG. 1 is a graph showing variation of the output torque (curve $t$) and the fuel consumption rate (curve $f$) of an automotive internal combustion engine in terms of the air-to-fuel ratio of an air fuel mixture supplied to the engine;

FIG. 2 is a fragmentary sectional view which shows a preferred embodiment of the present invention;

FIG. 5 is a graph showing an example of the variation in the air-to-fuel ratio of the air-fuel mixture controlled under various operating conditions of the engine in accordance with the present invention;

FIG. 6 is a schematic view which illustrates another preferred embodiment of the present invention applied to an internal combustion engine using a carburetor;

DESCRIPTION OF THE PREFERRED EMBODIMENTS

As previously discussed, there is a tendency in an automotive internal combustion engine that the power output and the fuel consumption rate of the engine vary with the air-to-fuel ratio of the mixture of air and fuel supplied to the engine. More specifically, the output torque and the fuel consumption rate of an automotive internal combustion engine tend to droop as the air-fuel mixture fed to the engine becomes leaner or the air-to-fuel ratio of the mixture becomes higher within a range in which an ordinary automotive internal combustion engine is operable or desired to operate for technical and economical reasons, as will be seen from curves $t$ (engine output torque) and $f$ (engine fuel consumptiom rate), respectively, of FIG. 1. If, therefore, the engine is equipped with the previously described prior art mixture control means arranged to provide an air-to-fuel ratio within a fixed, relatively high range of, for example, from about 14:1 to about 16:1 as indicafted by A in FIG. 1 throughout the various operating conditions of the engine, then the output torque achievable by the engine is limited below a certain level indicated by $t_o$ in FIG. 1 so that the engine is unable to produce a sufficient power output even when the engine is required to deliver an increased power output under highly loaded operating conditons during, for example, acceleration or hill climbing. If, however, the mixture to be supplied to the engine is enriched during such operating conditions so that the air-to-fuel ratio of the mixture falls within an appropriately lower range of, for example, about 10:1 to 13:1 as indicated by B in FIG. 1, then the output torque of the engine can be augmented over the level $t_o$. The above-mentioned ranges A and B of the air-to-fuel ratio are herein termed the steady-state range and the power step-up range, respectively, and the goal of the present invention is to enable an automotive internal combustion engine to operate on an air-fuel mixture proportioned within the steady-state range during low to medium load conditions and within the power step-up range during high load conditions of the engine. Thus, the present invention will provide improved fuel economy and strictly controlled exhaust emission characteristics for low to medium load conditions to which the engine is subjected most frequently when a vehicle is cruising in urban areas and will enable the engine to deliver an increased power output under highly loaded operating conditions.

Figure 7:
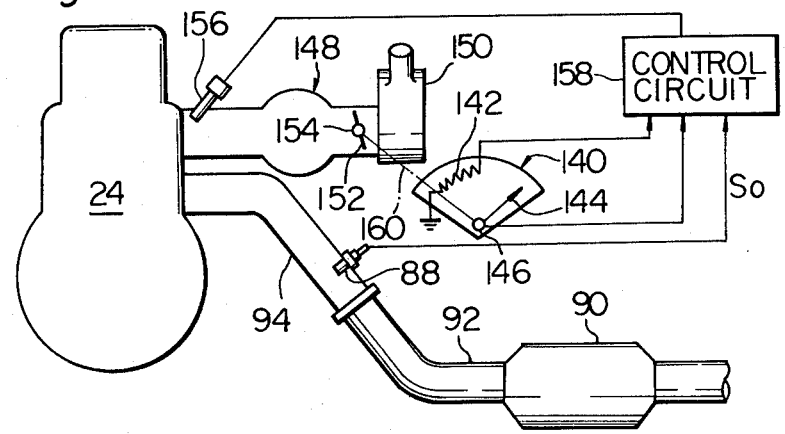
FIG. 7 is a schematic view showing an embodiment in which the basic concept of the embodiment of FIG. 6 is realized in an internal combustion engine having a fuel-injection type mixture supply system.

To achieve such a goal in an automotive internal combustion engine provided with the prior art mixture control means of the described character, the present invention proposes to vary the air-to-fuel ratio of the mixture supplied to the engine by (1) delivering an additional quantity of fuel into the mixture supply system of the engine during high load conditions, (2) making the mixture control means inoperative and producing an enriched mixture in the mixture supply system during the high load conditions or (3) injecting secondary air into the exhaust system for diluting the exhaust gases during such conditions so that the control means is "counterplotted" to act as if it were supplied with information that the mixture formed in the mixture supply system has been excessively leaned out. FIGS. 2 and 6 illustrate embodiments adapted to carry out the above-mentioned schemes (1) and (2), respectively, in internal combustion engines using carburetors as the mixture supply systems. FIG. 7 shows an embodiment in which the scheme (2) is realized in an internal combustion engine having a mixture supply system of the fuel injection type. The embodiment shown in FIG. 8 has incorporated therein the above-mentioned scheme (3) and may be applied to an internal combustion engine using a carburetor or a mixture supply system of the fuel injection type.

Referring to FIG. 2, a carburetor of an automotive internal combustion engine is shown, by way of example, as being of the double venturi type and has a mixture induction pipe 10 which is formed with a primary venturi 12 and a secondary venturi 14. The mixture induction pipe 10 has a throttle valve 16 rotatable with a shaft 18 and located downstream of the venturi 14 and, though not shown in FIG. 1, communicates upstream with an air cleaner (indicated at 20 in FIG. 6) through an air horn (indicated at 22 in FIG. 6) and downstream with engine cylinders (generally indicated at 24 in FIG. 6) through an intake manifold (indicated at 26 in FIG. 6), as is customary in the art. The carburetor has an emulsion block 28 formed with main and low-speed fuel supply circuits which originating in a float bowl or fuel reservoir 30 having a float 32. As is well known, float bowl 30 is in communication with a fuel storage tank through a flow control valve operated by the float 32 and thus stored therein fuel 34 which is pumped from the tank, though not shown in the drawings. The main fuel supply circuit comprises a main fuel feed passageway 36 leading from a bottom part of the float bowl 30 through a main fuel metering jet 38. The passageway 36 terminates in a main well 40 having a perforated atomizer tube 42 which is vented from the air horn through a main air bleed 44. A main fuel discharge nozzle 46 extends fro the main well 40 and opens in the primary venturi 12 in the mixture induction pipe 10. On the other hand, the low-speed fuel supply circuit comprises a fuel feed passageway 48 branched from the main fuel feed passageway 36 and terminates in a low-speed well 50 which also has a perforated atomizer tube 52. A low-speed fuel discharge passageway 54 extends from the top of the low-speed well 50 and is vented from the air horn through a low-speed air bleed 56. The low-speed fuel discharge passageway 54 is open into the mixture induction pipe 10 through a low-speed fuel outlet port 58 located slightly downstream of the throttle valve 16 in a fully closed position as illustrated and further through an idling fuel outlet port 60 located downstream of the low-speed fuel outlet port 5. The idling fuel outlet port 60 is adjustable by an idle adjustment screw 62 having a metering valve 64 projecting into the port 60. The low-speed fuel supply circuit further comprises an emulsifying air inlet passageway 66 which is vented from the air horn through a calibrated restriction or orifice 68 and which extends into the low-speed well 50 as shown.

Figure 3:
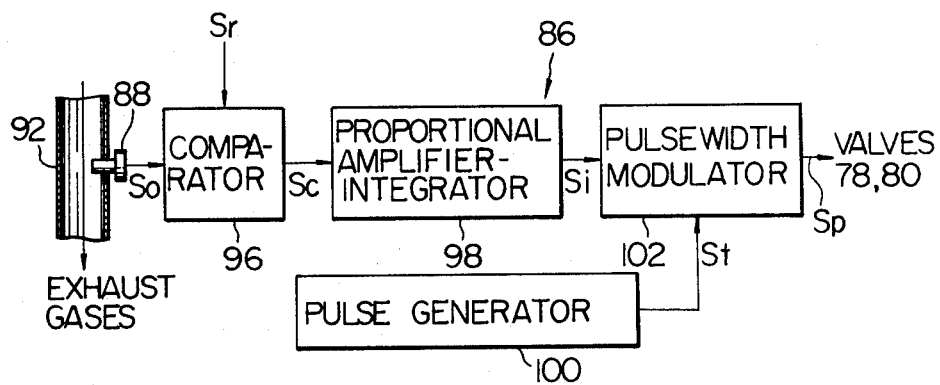
FIG. 3 is a block diagram illustrating an example of an electric control circuit which may be incorporated into the embodiment shown in FIG. 2.
Figure 4:
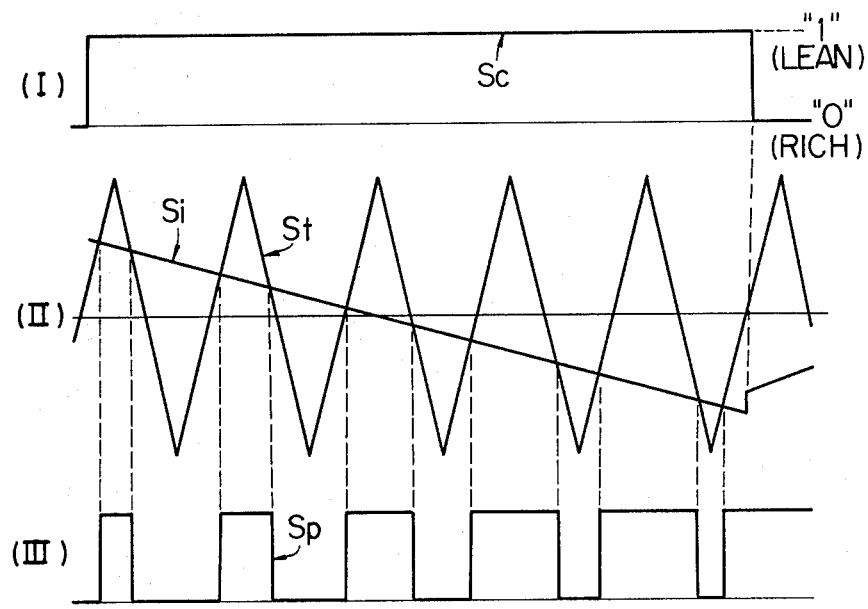
FIG. 4 is a graph showing examples of waveforms which may be produced in the control circuit shown in FIG. 3.

The main and low-speed fuel supply circuits further comprise additional air bleed passageways 70 and 72 having fitted therein calibrated restrictions 74 and 76, respectively. The passageways 70 and 72 are in communication with the open air through solenoid-operated, main and low-speed air delivery control valves 78 and 80, respectively, each of which is assumed to be so arranged as to be open when energized and to close when de-energized. The air delivery control valves 78 and 80 have respective solenoid coils (not shown) connected by lines 82 and 84 to an electric control circuit 86. The control circuit 86 operates on the basis of an analog electrical signal, usually in the form of voltage, supplied from an exhaust gas sensor 88 disposed in the exhaust system of the engine. The exhaust system is provided with a catalytic reactor 90 located in an exhaust pipe 92 forming part of the exhaust system, whilst the exhaust gas sensor 88 is located in the exhaust pipe 92 upstream of the catalytic reactor 90 as shown. If desired, the sensor 88 may be located in a downstream or converged portion of an exhaust manifold (not shown in FIG. 2 but indicated at 94 in FIGS. 6, 7 and 8) upstream of the exhaust pipe 92. The exhaust gas sensor 88 is herein assumed, by way of example, to be an oxygen sensor which is operative to detect the concentration of the oxygen component in the exhaust gases passed through the exhaust manifold and to produce an analog output signal proportional or otherwise representative of the detected concentration of the oxygen component. On the other hand, the catalytic reactor 90 is assumed, also by way of example, to be of the ternary type which is reactive to three different kinds of toxic air-contaminative compounds such as hydrocarbons, carbon monoxide and nitrogen oxides. The control circuit 86 is, thus, preferably arranged to control the main and low-speed air delivery control valves 78 and 80 in such a manner that the emulsions respectively formed is the main and low-speed fuel supply circuits are so proportioned as to produce, when mixed with air in the mixture induction pipe 10, an air-fuel mixture having an air-to-fuel ratio within the previously mentioned steady-state range of, for example, from about 14:1 to about 16:1, viz., within a range approximately the stoichiometric mixture ratio of about 14.8:1, for the reason previously explained. The control circuit 86 adapted to achieve this purpose may be readily designed by those skilled in the art. FIG. 3 illustrates an example of such a control circuit and FIG. 4 shows examples of waveforms which may be produced in the circuit arrangement. It may be noted, however, that the circuit arrangement herein shown is merely for the purpose of illustration and may be changed and modified in numerous manners.

Referring to FIG. 3, the control circuit 86 comprises a comparator 96, a combination proportional amplifier and integrator 98, a saw-tooth or triangular pulse generator 100 and a pulsewidth modulator 102. The comparator 96 has an input terminal connected to the above-mentioned oxygen sensor 88 and is constantly supplied, during operation, with a fixed reference signal $Sr$ which is a representation of a predetermined concentration of the oxygen component in the exhaust gases. The comparator 96 is, thus, operative to compare the signal, denoted by $So$, delivered from the oxygen sensor 88 with the fixed reference signal $Sr$ and to thereby produce a binary signal $Sc$ which assumes a logic "0" value when the former is higher than the latter (viz., when the exhaust gases are found richer than a predetermined level represented by the reference signal $Sr$) and a logic "1" value when the former is lower than the latter (viz., when the exhaust gases are found leaner than the above-mentioned level), as indicated in graph (I) of FIG. 4. The output signal $Sc$ of the comparator 96 is fed to the combination proportional amplifier and integrator 98 which then produces a linear ramp signal $si$ which increases or decreases in response to the input signal $Sc$ of the logic "0" or "1" value, respectively, as indicated in graph (II) of FIG. 4. On the other hand, the saw-tooth or triangular pulse generator 100 is operative to produce a train of saw-tooth or triangular pulses $St$ with a constant pulsewidth and at a constant rate as is also shown in the graph (II) of FIG. 4. The ramp signal S$i$ produced by the combination proportional amplifier and integrator 98 and the train of pulses S$t$ thus produced by the saw-tooth or triangular pulse generator 100 are fed to the pulsewidth modulator 102. The pulsewidth modulator 102 is, in effect, a comparator and is operative to compare the ramp signal S$i$ and the train of pulses S$t$ with each other for producing a train of square-shaped pulses S$p$ when the saw-tooth or triangular pulses S$t$ are higher in magnitude than the ramp signal S$i$, as shown in graph (III) of FIG. 4.

Reverting to FIG. 2, the square-shaped pulses S$p$ delivered in this fashion from the control circuit 86 are fed in succession to the solenoid-operated main and low-speed air delivery control valves 78 and 80 through the lines 82 and 84, respectively. Each of the valves 78 and 80 is thus controlled basically in accordance with the signal S$o$ continuously supplied from the oxygen sensor 88 in the exhaust system and periodically opens and closes each of the additional main and low-speed air bleed passageways 70 and 72 at time intervals which are dictated by the pulses S$p$. As a consequence, the air-fuel mixture formed in the mixture induction pipe 10 is proportioned to have an air-to-fuel ratio approximating the stoichiometric ratio and, in the result, the exhaust gases discharged from the engine cylinders are conditioned to be such that are optimum for being processed by the ternary catalytic reactor 90. As previously noted, the air-to-fuel ratio of the mixture produced in the mixture induction pipe 10 is appropriate for low to medium load operating conditions of the engine but is not acceptable under highly loaded or full throttle conditions of the engine.

To avoid this problem, the carburetor shown in FIG. 2 comprises, in addition to the above described main and low-speed fuel supply circuits and the control means therefore, a power step-up fuel delivery circuit which is adapted to be brought into play in response to wide open throttle conditions of the caburetor. The power step-up fuel delivery circuit comprises a fuel metering chamber 104 which is in communication with the float bowl 30 through an orifice 106 at the top of the chamber 104. The fuel metering chamber 104 has an outlet port 108 communicating through a calibrated restriction or orifice 108 with a power step-up fuel feed passageway 110 which extends into the main fuel feed passageway 36. A fuel metering valve 112 is positioned within the chamber 104 and is movable toward and away from or, in the arrangement shown, upwardly into or downwardly from a position to close the orifice 106. The fuel metering valve 112 has a head portion which is tapered so that, when the valve 112 is moved remoter away from the orifice 106, an increasing annulus space is formed between the valve head and the wall surface defining the chamber 104 whereby the fuel in the float bowl 30 is allowed to flow into the chamber 104 at an increasing rate through the orifice 106. The fuel metering valve 112 is urged toward the position to close the orifice 106 by suitable biasing means such as a preloaded, helical compression spring 114 which is seated between the valve 112 and the bottom face of the chamber 104 as shown. The fuel metering valve 112 has a valve stem portion 116 projecting outwardly, viz., upwardly from the chamber 104 through the orifice 106. The above-mentioned fuel metering chamber 104, orifice 106 and fuel feed passageway 110 are all formed in a wall portion forming part of the emulsion block 28.

In the wall portion of the emulsion block 28 are further formed first and second, or lower and upper bores 118 and 120, which are vertically in line with the above-mentioned orifice 106 and which are in communication with each other through an aperture 122 also formed in the wall portion of the emulsion block 28. The first, or lower bore 118 has a bottom end open to the interior of the float bowl 30 and located above the orifice 106, while the second, or upper bore 120 communicated with a vacuum passageway 124 leading from the mixture induction pipe 10 downstream of the throttle valve 16 as shown. If desired, the vacuum passageway 124 may be led from the intake manifold posterior to the mixture induction pipe 10, though not shown. A piston 126 is axially slidable back and forth in the second or upper bore 120 and an actuating rod 128 projects from the lower end face of the piston 128 and extends axially downwardly through the aperture 122 and out of the lower bore 118, terminating immediately above the valve stem portion 116 of the fuel metering valve 112. The actuating rod 128 has integrally formed or fixedly carried at its lower end a spring seat member 130 through which the actuating rod 128 is engageable with the valve stem portion 116 of the valve 112 when the rod 128 and the valve 112 are vertically moved closer to each other. The actuating rod 128 with the spring seat member 130 is urged downward, viz., toward the stem portion 116 of the fuel metering valve 112 by suitable biasing means such as a preloaded, helical compression spring 132 which is seated at one end on the spring seat member 130 and at the other on the annular wall face defining the upper end of the lower bore 118, as shown. The piston 126 forms in the upper bore 120 a contractable chamber 120$a$ between the upper end face of the piston and the top end of the bore 120. The contractable chamber 120$a$ thus forming part of the upper bore 120 is in constant communication with the vacuum passageway 124 so that the actuating rod 128 is held in pressing engagement with the stem portion 116 of the fuel metering valve 112 through the spring seat member 130 by the force of the preload spring 132 in the absence of a vacuum in the contractable chamber 120$a$. The preload springs 114 and 132 are selected in such a manner that the force of the spring 114 urging the fuel metering valve 112 upward is overcome by the force of the spring 132 urging the actuating rod 128 downward in the absence of vacuum in the contractable chamber 120$a$. For the reason which will be clarified later, it is important that the power step-up circuit thus arranged be so calibrated as to produce, in the mixture induction pipe 10, an air-fuel mixture having an air-to-fuel ratio within the previously defined power step-up range even when the valves 78 and 80 are actuated to deliver air into the air bleed passageways 70 and 72 at maximum rates.

During low to medium load operating conditions of the engine, the throttle valve 16 of the carburetor is in a part throttle position so that a partial vacuum is established in the mixture induction pipe 10 downstream of the throttle valve 16. The vacuum is transferred through the vacuum passageway 124 into the contractable chamber 120$a$ above the piston 126 in the upper bore 120 and acts on the piston 126, urging the piston 126 to move upwardly and contract the chamber 120$a$. This causes the actuating rod 128 to move upwardly with the piston 126 against the force of the preload spring 132 and, thus, allows the fuel metering valve 112 to move upwardly into a position closing the orifice 106 by the force of the preload spring 114 acting on the valve 112. The fuel metering chamber 104 is consequently isolated from the float bowl 30 and no additional fuel is allowed to flow into the power step-up fuel feed passageway 110 through the orifice 106 and the chamber 104. The air-to-fuel ratio of the air-fuel mixture formed in the induction pipe 10 is thus determined solely by the main and low-speed fuel supply circuits and the control means including the valves 78 and 80 in a manner previously described.

When, however, the engine is to operate in highly loaded condition with the carburetor throttle valve 16 wide open, substantially no vacuum or a vacuum slightly less than the atmospheric pressure is developed in the induction pipe 10 downstream of the throttle valve 16 and accordingly in the contractable chamber 120a. The actuating rod 128 is therefore moved downwardly by the force of the spring 132 and moves the fuel metering valve 112 downwardly against the force of the preload spring 114, thereby opening the orifice 106 between the float bowl 30 and the fuel metering chamber 104. Fuel in the float bowl 30 is thus passed through the annulus space between the tapered valve head portion of the fuel metering valve 112 and the wall surface defining the chamber 104 at a rate which is dictated by the extent of such a space. The fuel flows through the fuel metering chamber 104 and the power step-up fuel feed passageway 110 into the main fuel feed passageway 36 and is directed to the main well 40 together with the fuel which has been passed through the main fuel metering jet 38. More fuel is thus allowed to flow from the float bowl 30 into the main well 40 than can be supplied through the main fuel metering jet 38 alone, thus raising the level of the fuel in the main well 40. This reduces the distance the fuel in the main well 40 must be raised to the main fuel discharge nozzle 46 and accordingly the resistance applied to the flow of the fuel being discharged and, for this reason, fuel is delivered from the discharge nozzle 46 at an increased rate into the venturi 12 in the mixture induction pipe 10 and produces enrichment of the air-fuel mixture formed in the mixture induction pipe 10 to such a level that will be acceptable for the highly loaded operating conditions of the engine.

Analysis will be made on a more theoretical basis into the operation of the engine thus controlled with reference to FIG. 5 which shows the variation of the air-to-fuel ratio of the mixture produced in the induction pipe 10 when the carburetor throttle valve 16 is actuated to wide open from a part throttle position into a fully open or full throttle position. In FIG. 5, it is assumed that the steady-state range of the air-to-fuel ratio provided by the additional air delivery means for the main and low-speed fuel supply circuits is between 14:1 and 16:1 while the power step-up range of the air-to-fuel ratio of the mixture produced during the wide open throttle condition is between 10:1 and 13:1 for the reason previously set forth. When, now the carburetor throttle valve 16 is in a part throttle position producing low to medium load conditions of the engine, the power step-up fuel delivery circuit is held inoperative so that the fuel (which is in an emulsified state) delivered from the main and low-speed fuel supply circuits of the carburetor is proportioned, under the control of the valves 78 and 80, to eventually produce an air-fuel mixture whose air-to-fuel ratio falls within the steady-state range of from about 14:1 to about 16:1. Such an air-to-fuel ratio will approach the stoichiometric level of 14.8:1 if the low to medium load conditions of the engine are steadily continued. When, however, the carburetor throttle valve 16 is caused to open wider from the part throttle position, the power step-up fuel delivery circuit is put into operation as previously discussed so that additional fuel is discharged into the mixture induction pipe 10. This causes enrichment of the air-fuel mixture produced in the induction pipe 10 and accordingly results in reduction of the concentration of oxygen in the exhaust gases passed to the exhaust pipe 92. The oxygen sensor 88 detects the reduction of the oxygen component in the exhaust gases and, as a consequence, the control circuit 86 produces pulses $S_p$ calling for compensation for the excessively lowered air-to-fuel ratio of the mixture to be formed in the induction pipe 10. The solenoid-operated main and low-speed valves 78 and 80 are therefore so operated as to deliver air at incrased rates into the main and low-speed air bleed passageways 70 and 72, respectively with the result that the mixture which has once enriched is leaned out toward the steady-state range of air-to-fuel ratio. Because, however, of the fact that the power step-up circuit is calibrated in such a manner as to produce in the mixture induction pipe 10 a mixture with an air-to-fuel ratio within the power step-up range of, for example, from about 10:1 to about 13:1 even when the control valves 78 and 80 are operated to deliver air at maximum rates into the main and low-speed air bleed passageways 70 and 72 under the control of the pulses $S_p$ from the control circuit 86 as previously noted, the engine is enabled to operate properly and to thereby produce a required amount of driving torque when the carburetor throttle valve 16 is fully open, as will be understood from the curves of FIG. 5.

While it has been assumed in the above described embodiment of the present invention that the highly loaded condition of the engine is detected from the development of vacuum in the induction pipe downstream of the throttle valve or in the intake manifold of the engine, it is apparent that the change in the engine load may be detected from the change in the angular position of the carburetor throttle valve about the shaft thereof, if desired. As an alternative to controlling the proportions of air to be added to the fuel in the main and low-speed fuel supply circuits as in the embodiment thus far described, the main and low-speed circuits may be provided with control means adapted to control the rates of flow of fuel through the individual circuits in accordance with the signal $S_o$ produced by the oxygen sensor 88 or with any other signal representative of the concentration of a prescribed component of the exhaust gases. For the purpose, moreover, of providing stability of operation of the engine under low-speed running conditions during, for example, idling, only the concentration of the fuel delivered through the main fuel supply circuit may be controlled by the signal $S_o$ or any other signal of the above-mentioned nature. Such a purpose can be achieved in the arrangement shown in FIG. 2 by removing the additional air bleed passageway 72 and the control valve 80 for the low-speed fuel supply circuit from the arrangement shown.

FIG. 6 illustrates another preferred embodiment of the present invention. In FIG. 6, the present invention is shown to be also embodied in an automotive internal combustion engine of the type using a carburetor as the mixture supply system and the carburetor is shown to be essentially similar to that illustrated in and described with reference to FIG. 2, like reference numerals thus designating corresponding units and members. In the engine arrangement of FIG. 6, however, the intake and exhaust manifolds 26 and 94 are shown to be connected together across a partition member 134 through which to transfer heat from the exhaust gases to the mixture entering the intake manifold 26. The quantity of heat to be transferred can be varied by means of an automatically adjusted damper plate 136 for regulating the draft of the exhaust gases toward the partition member 134.

As previously noted, the embodiment shown in FIG. 6 is adapted to realize the scheme of disabling the mixture control means (which is in this instance constituted essentially by the solenoid-operated, main and low-speed air delivery control valves 78 and 80) from operating during highly loaded or wide open throttle conditions of the engine. The valves 78 and 80 are, thus, controlled by means of an electric control circuit 138 which operates essentially similarly to the control circuit 86 of the embodiment of FIG. 2 on the basis of the signal from the sensor 88 during low to medium load conditions of the engine. The sensor 88 in the embodiment herein shown is also assumed to be an oxygen sensor and is operative to produce an output signal $So$ representative of the concentration of oxygen in the exhaust gases. During highly loaded conditions of the engine, however, the control circuit 138 operates to maintain the valves 78 and 80 closed although the circuit 138 may be continuedly supplied with the signal $So$ from the oxygen sensor 88. The main and low-speed fuel supply circuits of the carburetor shown in FIG. 6 are therefore arranged in such a manner that the fuel delivered therethrough is proportioned to produce, eventually in the mixture induction pipe 10, an air-fuel mixture with an air-to-fuel ratio falling within a steady-state range of, for example, from about 14:1 to about 16:1 when the valves 78 and 80 are under the control of the control circuit 138 and within a power step-up range of, for example, from about 10:1 to about 13:1 when the valves are concurrently in closed conditions. To achieve this purpose, the control circuit 138 may comprise tripping means 139 in addition to the previously mentioned circuit components of the control circuit 86 arranged as shown in FIG. 3, viz., the comparator 96, combination proportional amplifier and integrator 98, saw-tooth or triangular pulse generator 100 and pulse-width modifier 102, though not shown in FIG. 6. The above-mentioned tripping means may comprise a normally closed relay as diagrammatically shown which may be connected to the output terminal or each of the output terminals of the pulsewidth modulator 102. Means is provided for actuating such a tripping means in response to highly loaded condition of the engine, comprising a potentiometer 140 which consists of a resistor 142 connected at one end to the control circuit 138 (or more exactly to one input terminal of the tripping means of the circuit) and grounded at the other end and a sliding contact 144 electrically connected to the control circuit 138 (or another input terminal of the tripping means thereof) and rotatable about a pivot 146. The sliding contact 144 is mechanically connected to the shaft 18 of the throttle valve 16 of the carburetor by means of a mechanical linkage 148 indicated by a phantom line and is thus caused to turn about the pivot 146 as the carburetor throttle valve 16 is rotated about the axis of the shaft 18. The potentiometer 140 is arranged in such a manner that the sliding contact 144 remains in an angular position disconnected from the resistor 142 when the throttle valve 16 is in a part throttle position or turned through a predetermined angle of, for example, 45° from its fully closed position and an angular position connected to the resistor 142 when the throttle valve 16 is in a wide open position or rotated through more than such a predetermined degrees from the fully closed position. When the sliding contact 144 is thus kept disconnected during the part throttle conditions of the engine, the tripping means or the normally closed relay remains closed so that the previously mentioned square-shaped pulses $Sp$ are delivered from the control circuit 138 to the solenoid-operated main and low-speed air delivery control valves 78 and 80 so that the fuel in the main and low-speed fuel supply circuits is proportioned to produce in the mixture induction pipe 10 a mixture having an air-to-fuel ratio within the steady-state range previously mentioned. When, however, the carburetor throttle valve 16 is rotated into a wide open position for producing highly loaded conditions in the engine cyliders, then the sliding contact 144 is connected to and slides on the resistor 142 and causes the tripping means or the relay of the control circuit 138 to open. The solenoid-operated valves 78 and 80 are consequently de-energized and maintained closed, ceasing the supply of additional air to the fuel in the main and low-speed fuel supply circuits. This produces enrichment of the air-fuel mixture formed in the mixture induction pipe 10 to such an extent as to have an air-to-fuel ratio falling within the previously mentioned power step-up range and enables the engine to deliver an output torque required under the high load conditions. If desired, such fuel enrichment technique can be used for the purpose of providing stability of operation of the engine by detecting the fully closed throttle condition of the engine and making the control circuit temporarily inoperative in a way same as described above.

As an alternative of the air delivery control arrangement including the valves 78 and 80 in the embodiment above described, the main and low-speed fuel supply circuits may be provided with valve means adapted to regulate the flows of fuel to be delivered from the circuits during low to medium load conditions of the engine. In this instance the valve means should be maintained open in response to high load conditions of the engine irrespective of the signal $So$ from the oxygen sensor so that fuel is allowed to be delivered from each of the main and low-speed fuel supply circuits at a maximum rate which is calibrated for each individual fuel supply circuit.

FIG. 7 illustrates an embodiment in which the basic concept of the embodiment above described is realized in an automotive internal combustion engine with a mixture supply system of the fuel injection type. As is schematically shown in FIG. 7, the fuel-injection mixture supply system of an internal combustion engine comprises an air intake manifold 148 which is in communication upstream with an air cleaner 150 and downstream with intake ports (not shown) of the engine cylinders 24. The air intake manifold 148 has mounted therein a throttle valve 152 rotatable about the axis of a shaft 154 and a series of fuel injection nozzles 156 only one of which is seen in FIG. 7. Each of the fuel injection nozzles 156 is directed toward each of the mixture intake ports in the cylinder head and are in communication with a fuel reservoir or float bowl through fuel distribution lines, though not shown. Each of the fuel injection valves 156 is electrically controlled by means of a control circuit 158 which is arranged essentially similarly to the control circuit 138 of the embodiment illustrated in FIG. 6 but which is adapted to control the fuel delivery rate of each fuel injection valve in accordance with the operating conditions of the engine. The control circuit 158 is thus supplied with signals from an oxygen sensor 88 and a potentiometer 140 which are arranged similarly to their counterparts in the embodiment of FIG. 6, except in that the sliding contact 144 of the potentiometer 140 is connected by means of a mechanical linkage 160 to the shaft 154 of the throttle valve 152 in the air intake manifold 148. The oxygen sensor 88 is shown mounted in the exhaust manifold 94 and is operative to produce an output signal So representative of the concentration of an oxygen component in the exhaust gases discharged from the engine cylinders 24. The catalytic reactor 90 is shown mounted in the exhaust pipe 92 and is assumed to be of the previously mentioned ternary type.

The control circuit 158 is arranged to control the fuel delivery rate of each of the fuel-injection valves 156 on the basis of the output signal So of the oxygen sensor 88 during low to medium load operating conditions of the engine when the sliding contact 144 of the potentiometer 140 is kept disconnected from the resistor 142 with the throttle valve 152 in a part throttle position. When, however, the engine is being operated under highly loaded conditions with the throttle valve 152 in a wide open position at a degree more than, for example, 45 degrees from the fully closed position thereof, the sliding contact 144 is in an angular position contacting the resistor 142. The control circuit 158 has incorporated therein tripping means adapted to be put into operation when the sliding contact 144 is thus connected to the resistor 142, as is the case with the control circuit 138 of the embodiment shown in FIG. 6. During the high load operating conditions of the engine, therefore, the tripping means in the control circuit 158 is actuated and permits each of the fuel-injection valves 156 to deliver fuel into the mixture intake port at a rate which will produce an air-fuel mixture having an air-to-fuel ratio within a power step-up range of, for example, from about 10:1 to about 13:1.

The control circuit 158 has been described and shown to be connected to the fuel injection valves 156, but, if desired, the control circuit 158 may be arranged to control a fuel metering unit which may be connected between the fuel reservoir and the fuel distribution lines. It is apparent that the basic concept of the embodiment shown in FIG. 7 is applicable to an automotive internal combustion engine of the type in which fuel is injected directly into the cylinders 24.

Figure 8:
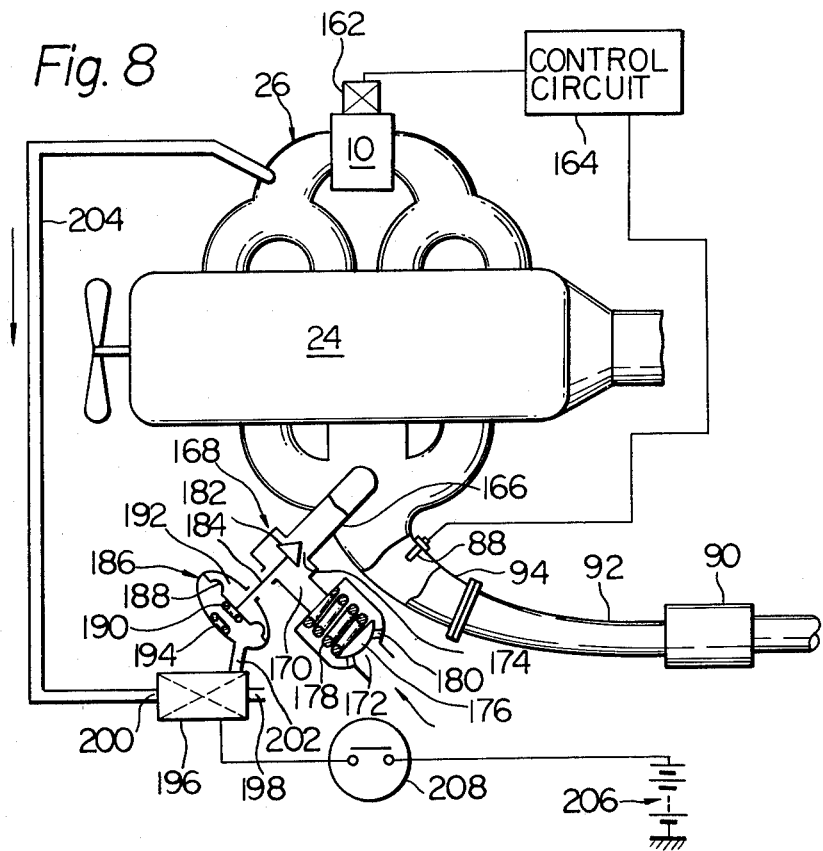
FIG. 8 is a schematic top plan view showing still another preferred embodiment of the present invention.

FIG. 8 illustrates stll another preferred embodiment of the present invention. As previously noted, the embodiment herein shown is adapted to carry out the scheme in which the mixture control means designed to produce an air-to-fuel ratio within a steady-state range is "counterplotted" during high load operating conditions of the engine. The internal combustion engine shown in FIG. 8 is assumed to be of the type using a carburetor as the mixture supply system. The carburetor is shown comprising a mixture induction pipe 10 which is connected to the cylinders 24 through the intake manifold 26. Though not shown, the carburetor is provided with main and low-speed fuel supply circuits which are arranged to be similarly to those illustrated in FIG. 2. The delivery rates of air or fuel or both through the main and low-speed fuel supply circuits are controlled by solenoid-operated valve means 162 which is in turn controlled by an electric control circuit 164. For convenience of description, the valve means 162 is assumed to comprise the main and low-speed air delivery control valves 78 and 80 incorporated in the embodiment illustrated in FIG. 2. The control circuit 164 is, for this reason, assumed to be arranged similarly to the circuit 86 illustrated in FIG. 3. and thus operates on the output signal So supplied from an oxygen sensor 88 mounted in the exhaust manifold 94. The catalytic reactor 90 shown provided in the exhaust pipe 92 is assumed to be of the ternary type reactive to three kinds of air pollutants such as hydrocarbons, carbon monoxide and nitrogen oxides as previously mentioned.

In the embodiment illustrated in FIG. 8, secondary air supply means is provided which comprises an air injection nozzle 166 projecting into the exhaust manifold 94 upstream of the oxygen sensor 88 and an air delivery control valve 168 connected to the nozzle 166. The air delivery control valve 168 comprises an air chamber 170 having an air inlet port 172 open to the atmosphere and an air outlet port 174 which is open to the air injection nozzle 166. The air inlet port 172 is provided a one-way check valve 176 which is urged by a preload spring 178 to be seated on a valve seat 180 and thus close the air inlet port 172. The check valve 176 is operative to prevent the exhaust gases from being passed through the air chamber 170 to the atmosphere when the pulsating pressure of the exhaust gases is positive. The air delivery control valve 168 further comprises a valve head 182 which is movable into and out of a position to close the air outlet port 174. The valve head 182 is preferably tapered toward its leading end as illustrated so that the rate of flow of air through the air outlet port 174 is continuously variable when the valve head 182 is moved toward and away from the air outlet port 174. The valve head 182 is integral with or fixedly connected to a valve stem 184 which longitudinally movably projects out of the air chamber 170 for connection to a vacuum sensitive valve actuator 186. The valve actuator 186 comprises an enclosure which is divided by a diaphragm 188 into a control chamber 190 and an air chamber 192 which is constantly open to the atmosphere. The valve stem 184 extends through the air chamber 192 and is connected to the diaphragm 188. A preload spring 194 is mounted within the vacuum chamber 190 and urges the diaphragm to contract the air chamber 192 so that the valve head 182 is biased to close the air outlet port 174 of the air chamber 170. A solenoid-operated two-position shift valve 196 has air and vacuum inlet ports 198 and 200 and an outlet port 202 which is constantly in communication with the control chamber 190 of the valve actuator 186. The air inlet port 198 is open to the atmosphere and the vacuum inlet port 200 is in communication with the intake manifold 26 through a vacuum passageway 204. The two-position shift valve 196 thus arranged has a first position providing communication between the air inlet port 198 and the outlet port 202 and a second position providing communication between the vacuum inlet port 200 and the outlet port 202. When the shift valve 198 is in the first position, atmospheric air is allowed to flow through the air inlet port 198 and the outlet port 202 of the valve 198 into the control chamber 190 of the valve actuator 186. When this occurs, the diaphragm 188 is subjected to atmospheric pressure on both sides thereof so that the control chamber 190 is expanded and simultaneously the air chamber 192 is contracted by the force of the preload spring 194 and, accordingly, the valve head 182 is forced into the position to close the air outlet port 174 of the air chamber 170. When, however, the two-position shift valve 196 is in the second position thereof, the control chamber 190 of the valve actuator 186 is in communication with the intake manifold 26 through the outlet port 202 and the vacuum inlet port 200 of the shift valve 196 and the vacuum passageway 204 so that, if a vacuum obtains in the intake manifold 26, a subatmospheric pressure is developed in the control chamber 190. The subatmospheric pressure acts on the diaphragm 188 and causes the control chamber 190 to contract and the air chamber 192 to expand against the opposing force of the preload spring 194 so that the valve head 182 of the air delivery control valve 168 is caused to withdraw from the position closing the air outlet port 174 of the air chamber 170. The shift valve 196 has a solenoid coil (not shown) connected to a d.c. power source 206 across a switch 208. The switch 208 is responsive to the variation in the load on the engine and is closed in response to highly loaded operating conditions of the engine. The switch 208 is preferably arranged similarly to the potentiometer 140 incorporated in the embodment of FIG. 6. The two-position shift valve 196 is assumed to be in the first position thereof when de-energized and in the second position thereof when energized.

When the engine is operating under low to medium load conditions, the engine load sensitive switch 208 remains open so that the two-position shift valve 196 is in the first position providing communication between the air inlet port 198 and the outlet port 202 thereof. The valve head 182 of the air delivery control valve 168 is consequently held in the position closing the air outlet port 174 of the air chamber 170 by the force of the preload spring 194 of the valve actuator 196. Atmospheric air is therefore not allowed to flow into the air injection nozzle 166 through the valve 168. The control circuit 164 thus controls the valve means 162 of the carburetor on the basis of the signal So delivered from the oxygen sensor 88 so that the air-fuel mixture formed in the mixture induction pipe 10 is proportioned to have an air-to-fuel ratio falling within a steady-state range of, for example, from about 14:1 to about 16:1 enabling the catalytic reactor 90 to operate in optimum conditions. When, however, the engine is operated under highly loaded conditions as during acceleration, the engine load sensitive switch 208 closes and energizes the two-shift position valve 196, which is accordingly actuated into its second position providing communication between the vacuum inlet port 200 and the outlet port 202. The vacuum developed in the intake manifold 26 of the engine is now directed through the passageway 204 and the valve 196 into the control chamber 190 of the valve actuator 186 and acts on the diaphragm 188. This causes the valve head 182 of the air delivery control valve 168 to withdraw from the position closing the air outlet port 174 of the air chamber 170 as previously noted and provides communication between the air chamber 170 and the air injection nozzle 166. Atmospheric air is consequently admitted into the exhaust manifold of the engine through the air inlet port 172, air chamber 170 and air outlet port 174 of the valve 168 and the air injection nozzle 166. The atmospheric air is added as secondary air to the exhaust gases flowing in the exhaust manifold 94 and dilutes or leans out the exhaust gases. The oxygen sensor 88 senses the increased oxygen component in the exhaust gases with the result that the control circuit 164 calls for enrichment of the air-fuel mixture in the induction pipe 10 toward such an extent that the fuel component in the air-fuel mixture in the induction pipe 10 is proportioned to provide an air-to-fuel ratio of the steady-state range when mixed with an air component containing oxygen whose concentration is of the oxygen component in the exhaust gases, not of the mixture actually formed in the induction pipe 10. More fuel is thus delivered through the valve means 162 into the induction pipe 10 than is required for achieving the air-to-fuel ratio of the steady-state range and, as a consequence, the air-to-fuel ratio of the mixture produced in the induction pipe 10 is lowered below the steady-state range and thus falls within a power step-up range of, for example, from about 10:1 to about 13:1. The particular power step-up range of the air-to-fuel ratio will be achieved through selection of the rate at which secondary air is fed to the exhaust gases. The enrichment of the air-fuel mixture supplied to the engine cylinders 24 will give rise to an increase in the quantity of combustible residues such as hydrocarbon and carbon monoxide. The exhaust gases are, however, proportioned to an air-to-fuel ratio of the steady-state range by reason of the secondary air supplied to the exhaust gases so that the catalytic reactor 9 is continuedly enabled to achieve its maximum reaction efficiency.

While the embodiment shown in FIG. 8 has been assumed to be applied to an internal combustion engine using a carburetor as the mixture supply system, it is apparent that the basic concept of the particular embodiment may be realized in an engine having a mixture supply system of the fuel injection type provided the control circuit 164 is arranged to control the fuel delivery rate of the fuel injection nozzles. If desired, furthermore, the air injection nozzle 166 be branched into a plurality of branch nozzles each projecting into each of the exhaust ports of the individual engine cylinders so that the exhaust gases discharged from each exhaust port are mixed with secondary air before being admitted into the exhaust manifold. The solenoid-operated valve means 162 may be replaced with any other type of valve means such as diaphragm-assisted valve means or valve means with a servo motor which may be controlled by the control circuit 164.

The control circuit incorporated in each of the embodiments thus far described may be modified to be responsive not only to the high load operating conditions but to idling condition.

What is claimed is:

1. In an automotive internal combustion engine having a carburetor including main and low-speed fuel supply circuits connected in use to fuel storage means, an exhaust system, a sensor mounted in said exhaust system for detecting the air-to-fuel ratio of the exhaust gases and for producing a signal representative of the detected air-to-fuel ratio and control means including a control circuit which is electrically connected to said sensor and is operative in response to the signal from said sensor to produce a control signal and solenoid-operated main and low-speed air delivery control valves which are disposed respectively in said main and low-speed fuel supply circuits and are electrically connected to said control circuit, said solenoid-operated control valves being operative in response to the control signal from said control circuit to control the supply of additional air to the fuel in said main and low-speed fuel supply circuits to thereby maintain within a predetermined relatively high range the air-to-fuel ratio of the air-fuel mixture produced in said carburetor, an apparatus for improving the power output characteristics of the engine comprising detecting means for detecting variations of load conditions of the engine, said detecting means including a potentiometer which is operatively connected to a throttle valve of the engine for producing an electric signal in response to high load operating condition of the engine, and additional control means including a normally closed relay which is opened in response to the electric signal from said potentiometer to thereby cut the electrical connection between said solenoid-operated control valves and said control circuit thus causing said solenoid-operated control valves to be closed whereby the air-fuel ratio of the air-fuel mixture produced in said carburetor is altered into a range lower than said relatively high range.

* * * * *